United States Patent [19]

Bruns et al.

[11] Patent Number: 4,784,014
[45] Date of Patent: Nov. 15, 1988

[54] ROBOT JOINT WITH AN ELECTRIC DRIVE MOTOR

[75] Inventors: Joachim Bruns, Lichtenwald; Gerhard Gosdowski, Bietigheim-Bissingen; Andreas Kettner, Stuttgart, all of Fed. Rep. of Germany

[73] Assignee: Robert Bosch GmbH, Stuttgart, Fed. Rep. of Germany

[21] Appl. No.: 29,757
[22] PCT Filed: Feb. 19, 1986
[86] PCT No.: PCT/DE86/00062
§ 371 Date: Dec. 9, 1986
§ 102(e) Date: Dec. 9, 1986
[87] PCT Pub. No.: WO86/07555
PCT Pub. Date: Dec. 31, 1986

[30] Foreign Application Priority Data

Jun. 22, 1985 [DE] Fed. Rep. of Germany ....... 3522336

[51] Int. Cl.⁴ ............................................. F16H 37/00
[52] U.S. Cl. ...................................................... 74/640
[58] Field of Search .................. 74/640, 797, 801, 805; 310/83; 901/23, 25; 403/338, 335, 337, 97, 380

[56] References Cited

U.S. PATENT DOCUMENTS

| 3,091,979 | 6/1963 | Schaefer, Jr. et al. | 74/640 |
| 3,161,081 | 12/1964 | Musser | 74/640 |
| 3,482,770 | 12/1969 | Nelson | 74/640 |
| 4,041,808 | 8/1977 | Fickelscher | 74/800 |
| 4,062,601 | 12/1977 | Pardo et al. | 74/640 X |
| 4,096,766 | 6/1978 | Pardo et al. | 74/640 |
| 4,398,110 | 8/1983 | Flinchbaugh et al. | 310/83 |
| 4,479,403 | 10/1984 | Marschner et al. | 74/640 |
| 4,518,308 | 5/1985 | Graybowski et al. | 74/640 X |
| 4,543,011 | 9/1985 | Lindenthal | 403/338 |
| 4,616,529 | 10/1986 | Heinemann | 74/640 |

FOREIGN PATENT DOCUMENTS

| 0041136 | 12/1981 | European Pat. Off. |
| 2930006 | 2/1981 | Fed. Rep. of Germany |
| 8310067 | 6/1985 | Fed. Rep. of Germany |
| 3427819 | 1/1986 | Fed. Rep. of Germany |
| 2393655 | 1/1979 | France |

Primary Examiner—Leslie A. Braun
Assistant Examiner—David Novais
Attorney, Agent, or Firm—Michael J. Striker

[57] ABSTRACT

A robot joint has a support carrying a rotary robot arm. An electric drive motor is mounted on the support and its drive shaft is coupled to the robot arm by harmonic drive-type reduction gears. The reduction gears include an elastically deformable, externally toothed ring whose elliptical shape is rotated by the drive shaft. The externally toothed ring itself is stationary and is firmly connected to the support by a flexible sleeve provided at its free end with a rigid mounting flange. The annular mounting face of the flange and the opposite mounting face on the support is each provided with radial teeth, preferably in the form of Hirth-type gears, which guarantee an accurate centering of the sleeve and safeguard the same against turning. Preferably, the flange is fastened to the end face of a steel bushing which is pressed into a bore in the support and secured against turning by knurled serrations. The robot arm is mounted for rotation in a pretensioned cross-roller bearing which provides a compact and bend resistant connection to the support.

7 Claims, 1 Drawing Sheet

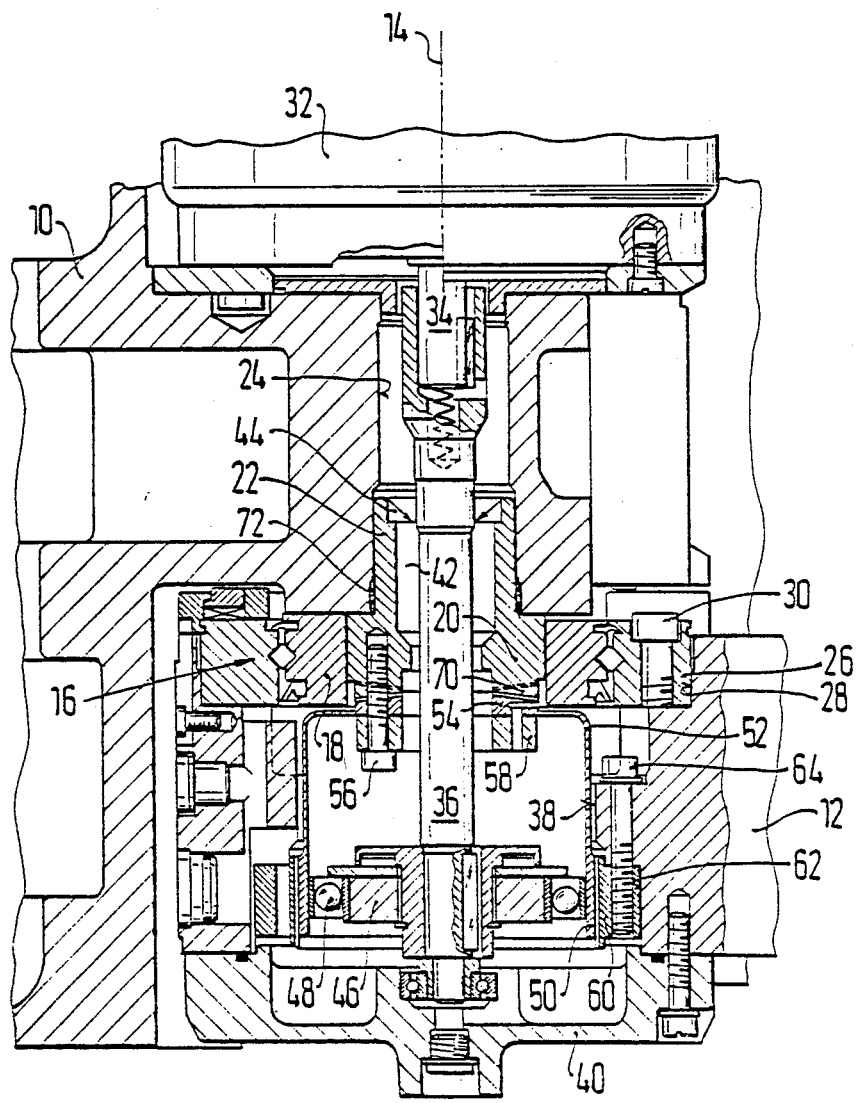

ROBOT JOINT WITH AN ELECTRIC DRIVE MOTOR

BACKGROUND OF THE INVENTION

The invention relates to a robot joint with an electric drive motor and a reduction gear (harmonic drive). In a known robot joint of this type the assembly flange of the flexibly deformed outer gear ring and the assembly area of the one robot part facing the same are provided with plane faces which are braced against each other with a plurality of mounting screws, whereby the torque is transmitted by the friction locking between the plane faces of the parts, as well as by the mounting screws themselves which are designed as tight-fit screws and/or by additional set pins. In these embodiments it may occur that the bores for receiving the tight-fit screws or setpins open out after a longer period of operation of the robot joint, so that an accurate positioning of the robot parts is no longer assured.

SUMMARY OF THE INVENTION

In contrast thereto, the device in accordance with the invention is advantageous in that in highly stressed robot joints a connection between the assembly flange of the flexibly shaped outer gear ring and the one robot part is maintained absolutely free from play over a long time of operation.

In robot joints, wherein the assembly face for the assembly flange of the flexibly deformed outer gear ring is formed in a bushing pressed into the one robot part, it is suggested that the bushing is additionally secured against twisting by means of a knurled gear in the receiving bore of the one robot part.

A compact and bending resistant mounting is obtained if the one robot part is mounted rotatably on the other robot part by at least one pretensioned roller bearing.

In robot joints, whose robot parts consist of light metal and wherein a steel bushing is pressed into the one robot part, on which the one half of the front gear is formed, a wear resistant embodiment is obtained if the inner barrel ring of the pretensioned roller bearing is mounted on the steel bushing.

BRIEF DESCRIPTION OF THE DRAWING

One exemplified embodiment of the invention is illustrated in the drawing and is explained in more detail in the subsequent description. The single figure illustrates a partial section through the exemplified embodiment.

DESCRIPTION OF THE PREFERRED EMBODIMENTS

The robot joint connects a support 10 with a robot arm 12 which is pivotably mounted in the support 10 around a joint axis 14. The mounting is performed free from play by means of a pretensioned roller bearing 16, preferably a cross roller bearing, whose inner barrel ring or race 18 is mounted on a shoulder 20 of a steel bushing 22 which is pressed into a bore 24 of support 10. The outer barrel ring or race 26 of the roller bearing 16 sits firmly in a recess 28 of the robot arm 12 and is mounted thereon free from play by screws 30.

An electromotor 32 is mounted coaxially with respect to the joint axis 14 on support 10, whose downwardly extending power output axis 34 is fixedly connected with a shaft 36. This shaft extends through the steel bushing 22 and a central bore 38 in the robot arm 12 and is rotatably mounted at its free end on a lid 40 which is fixedly screwed to the robot arm 12. The annular slot 42 between shaft 36 and the steel bushing 22 is sealed by a packing ring 44 against the upper segment of bore 24 which is not filled out by bushing 22.

A drive disk 46 with an elliptical outer shape is fixedly mounted on the drive shaft 36 in the area of bore 38 of the robot arm. On the outer circumference of disk 46 an elliptical ball bearing 48 is mounted. These and the elements which are described in the following are parts of a reduction gear which is named a harmonic drive, through which the electromotor 36 pivots the robot arm 12 with respect to the support 10. Such drives are known, so that the subject drawing is limited to the sectional view of its elements.

On the drive disk 46 with the mounted elliptical ball bearing 48 (wave generator) an elastically deformable, externally toothed ring 50 (flexspline) is mounted. The ring 50 is connected with a rigid assembly or mounting flange 54 by means of a thin walled electrically deformable socket or sleeve like intermediary member 52, which is fixedly secured by means of screws 56 and a clamping ring 58 on the lower end face of the steel bushing 22. The external teeth of the elliptically deformed ring 50 engage the teeth of an internally toothed ring 60 (circular spline) at two locations which are diametrically opposed in the large axis of the ellipse. The number of teeth of ring 60 differs slightly from that of the ring 50. The ring 60 sits in a recess 62 in robot arm 12, and is mounted thereon free from play by means of screws 64.

The externally toothed ring 50 is stationary and is mounted on support 10 by means of the sleeve 52 and the steel bushing 22. However, the elliptical shape of the ring 50 enforced by the drive disk 46 rotates with the speed of the drive shaft 36, so that also the two diametrically opposed engagement locations of the ring 50 and the ring 60 perform a rotating movement. Due to the different number of teeths of the ring 50 and the ring 60 an angular turning is transmitted to the ring 60 and thereby to the robot arm 12 during a rotation of drive shaft 36 corresponding to the difference in the number of teeth, so that the desired speed reduction is obtained in a single step.

The pretensioned roller bearing 16 results in a compact and bend resistant mounting of the robot arm 12 in support 10. For a complete free from play transmission of the torque the assembly or mounting flange 54 of the ring 50 and the end face of the steel bushing 22 facing the flange are each provided with a front gear 70 in accordance with the invention, preferably a Hirth-gear. By this gear 70 the parts are accurately centered and the reaction forces which are transmitted from the ring 50 to the steel bushing 22 and the support 10 are uniformly absorbed on a plurality of shoulder faces of the radial teeth. Only pulling or tension forces are exerted on the mounting screws 56.

The press seat of the steel bushing 22 in bore 24 is additionally secured in accordance with the invention by engaged teeth 72 between the parts 22 and 24, so that the steel bushing 22 is also rigidly mounted in support 10. The teeth 72 are preferably formed as a knurling of a part of the jacket face of the steel bushing, which bite into the softer material of the support during the pressing in of the steel bushing 22.

We claim:

1. A robot joint comprising a support part formed with a first bore; a robot part supported for rotation on said support part and being formed with a recess which communicates with said first bore; an electric motor mounted on said support part and being connected to a drive shaft which extends through said bore into said recess and is rotatable about a center axis; harmonic-drive-type reduction gears including an elliptical driving disk secured to said drive shaft, an elliptical ball bearing mounted on said driving disk and engaging without play the inner side of an elastically deformable, externally toothed ring; an elastically deformable, sleeve-shaped intermediate transmission member secured at one end thereof to said externally toothed ring and extending around said center axis into said recess and an internally toothed ring secured to said robot part and engaging at two diametrically opposed locations said externally toothed ring, said internally toothed ring having a different number of teeth than said externally toothed ring; a first annular mounting face provided on said support part around said first bore and being formed with radial teeth, a rigid flange secured to the opposite end of said intermediate transmission member, said rigid flange having a second annular mounting face provided with radial teeth engaging the radial teeth on the first mounting face; and means for fastening said rigid flange to said first mounting face.

2. The robot joint as defined in claim 1 wherein said first and second mounting faces are in the form of Hirth-type gears.

3. The robot joint as defined in claim 1, further comprising a bushing member pressed into said first bore, a wall portion of said first bore being formed with internal teeth engaging corresponding external teeth on said bushing to safeguard the bushing against rotation, and said first annular mounting face being an end face of said bushing.

4. The robot joint as defined in claim 3 wherein said interengaging internal and external teeth are in the form of knurlings.

5. The robot joint as defined in claim 3 wherein said robot part of the joint is connected to the support part by means of a pretensioned roller bearing.

6. The robot joint as defined in claim 5 wherein said pretensioned roller bearing is a cross-roller bearing.

7. The robot joint as defined in claim 5 wherein a portion of said bushing is increased in diameter and projects into said recess, said first annular mounting face being the end face of said increased bushing portion, and the inner race of said pretensioned roller bearing being mounted on a jacket of said increased bushing portion.

* * * * *